(12) United States Patent
Hahn et al.

(10) Patent No.: US 6,309,165 B1
(45) Date of Patent: Oct. 30, 2001

(54) LEG RESTRAINT FOR A PARKED SWAP BODY CONTAINER

(75) Inventors: Norbert Hahn, Franklin; Robert J. Harter, LaCrosse; Reinhard E. Sander, Milwaukee, all of WI (US); J. A. M. Van de Wiel, Drunen (NL)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/235,872

(22) Filed: Jan. 22, 1999

(51) Int. Cl.[7] .................................................. B65G 67/00
(52) U.S. Cl. ......................... 414/401; 248/351; 248/352; 414/584
(58) Field of Search ..................... 248/351, 352, 248/123.11, 503, 654; 410/56, 58, 61, 63; 414/401, 584

(56) References Cited

U.S. PATENT DOCUMENTS

| | | | |
|---|---|---|---|
| 2,361,690 | 10/1944 | Hunz | 254/110 |
| 2,569,038 | 9/1951 | Day | 189/34 |
| 3,281,160 | 10/1966 | Vinther et al. | 280/150 |
| 3,355,136 | 11/1967 | Staples | 248/352 |
| 3,537,724 | 11/1970 | Matthews | 280/150.5 |
| 4,268,066 | 5/1981 | Davis | 280/763 |
| 4,429,851 | 2/1984 | DeJager | 248/354 |
| 4,553,895 | * 11/1985 | Ellis | 414/401 |
| 4,664,582 | * 5/1987 | Edmeads | 414/401 |
| 4,674,941 | * 6/1987 | Hageman | 414/401 |
| 4,861,217 | * 8/1989 | Erlandsson | 414/401 |
| 4,938,647 | * 7/1990 | Erlandsson | 414/401 |
| 5,203,663 | 4/1993 | Ruppe | 414/401 |
| 5,575,492 | 11/1996 | Stone | 280/475 |
| 5,890,856 | 4/1999 | Huang | 410/151 |

FOREIGN PATENT DOCUMENTS

WO 92/22481    12/1992   (WO) .

OTHER PUBLICATIONS

*International Search Report* concerning International Application Ser. No. PCT/US00/01143, ISA/US, dated May 15, 2000, 6 pages.

\* cited by examiner

*Primary Examiner*—Anita King
(74) *Attorney, Agent, or Firm*—Marshall, Gerstein & Borun (57) ABSTRACT

A repositionable brace helps support the legs of a swap body freight container parked at a truck loading dock. The brace can move from a retracted position to an engaged position. In the engaged position, one end of the brace is at least partially fixed relative to the dock with an opposite end engaging at least one of the container's four legs. In the retracted position, the brace is positioned to where it is more out of the way when not in use, or positioned to align the brace to legs at other various locations. In some cases, the brace pivots between the locked and retracted positions manually, hydraulically, electro-mechanically or pneumatically. Also, a firm landing pad can be associated with the brace to provide a more consistent, level height at which the swap body is parked.

34 Claims, 11 Drawing Sheets

LEG RESTRAINT FOR A PARKED SWAP BODY CONTAINER

BACKGROUND OF THE INVENTION

1. Field of the Invention

The subject invention generally pertains to swap body containers, and more specifically, to a device that restrains a parked swap body container.

2. Description of Related Art

A swap body is typically a large freight container having four retractable legs. The legs are usually retracted while the swap body is in transit on the bed of a truck or trailer, ship or rail car. When parked at a truck loading dock, the legs are typically extended to support the container upon a driveway with the floor of the container generally aligned flush to the floor of the loading dock platform. This allows a forklift to drive into the container for loading or unloading, yet allows the truck that delivered the container to leave.

While the legs provide a vertical/columnar support for the weight of the container and its contents (and material handling equipment), the legs are not designed to resist substantial horizontal forces. Substantial horizontal forces, however, can be exerted on the legs. For example, if the forklift inside the container were to suddenly stop, by applying the brakes or striking cargo, the reaction force would be transmitted to the container's legs. Since a forklift can weigh thousands of pounds, and given the relative instability of the legs to resist horizontal movement, it is possible that an abrupt stop or collision could cause the container to move horizontally away from the dock, opening up a potentially hazardous gap between the container and the dock. Further, such horizontal movement could place a torque or bending force on one or all of the legs, causing them to buckle, or fold up, or (in a worst-case scenario) to collapse altogether. Such an accident might seriously harm the forklift operator, others nearby, the cargo or surrounding structure.

SUMMARY OF THE INVENTION

In order to minimize horizontal movement of a swap body away from the dock, there is provided a swap body leg brace that remains in the vicinity of a loading dock area. According to preferred embodiments, the brace is selectively repositioned from a retracted position to an engaged position on a leg of the swap body. In the engaged position, one end of the brace is preferably anchored to the driveway adjacent the loading dock, while an opposite end engages at least one leg of the swap body to minimize horizontal movement of the swap body away from the loading dock, and thus undesirable forces on the legs themselves that could lead to their failure.

In some embodiments, the brace assembly incorporates a firm landing pad on which the container legs may rest to provide a consistent, level height at which the swap body is parked.

In some embodiments, the brace is at least partially fixed relative to the loading dock when in the engaged position, yet somewhat free to be laterally or longitudinally positioned when in the retracted position. The positioning feature accommodates swap bodies whose legs are at various positions relative to the loading dock.

DESCRIPTION OF THE PREFERRED EMBODIMENT

Figure 1:
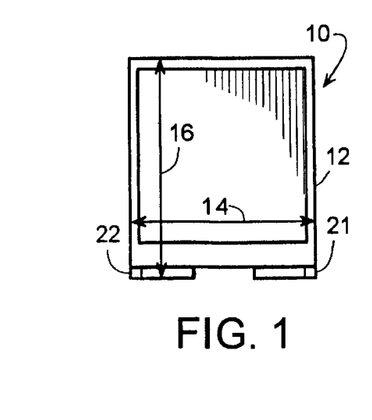
FIG. 1 is a front-end view of a swap body container.
Figure 2:
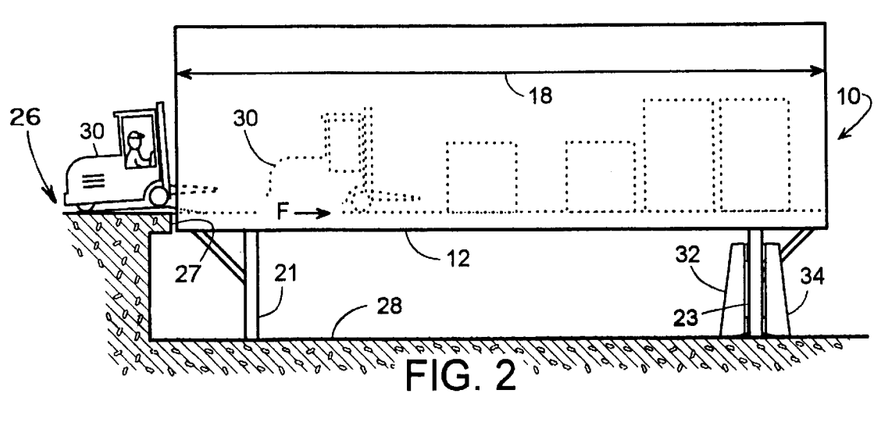
FIG. 2 is a side view of one embodiment.
Figure 3:
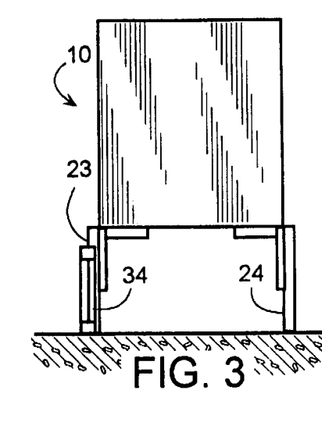
FIG. 3 is a rear view of FIG. 2

FIGS. 1, 2 and 3, respectively, show a front, side, and rear view of a swap body 10. Swap body 10 is primarily a relatively large freight container 12 with dimensions that may exceed an 8-foot width 14, an 8-foot height 16, and a 23-foot length 18. While in transit on a bed of a truck or trailer, ship, or rail car, the swap body's four legs 21, 22, 23 and 24 are typically folded up into a stowed position as shown in FIG. 1. When parked at a truck loading dock area 26, the legs 21–24 are unfolded to a downwardly extended position upon a driveway 28, as shown in FIG. 2. This allows a truck that delivered swap body 10 to leave, while container 12 may be loaded or unloaded by a forklift truck 30.

Movement of lift truck 30 inside the container, particularly quick stops and quick starts, results in forces F (FIG. 2) being exerted on the container. As legs 21–24 support container 10 in place, these forces F are transmitted to the legs, and can lead to torques and stresses within the legs that could lead to their failure. Use of one or more braces, as disclosed herein, helps reinforce and support the legs to minimize movement of the container away from the dock, and thus harmful stresses on the legs.

Figure 4:
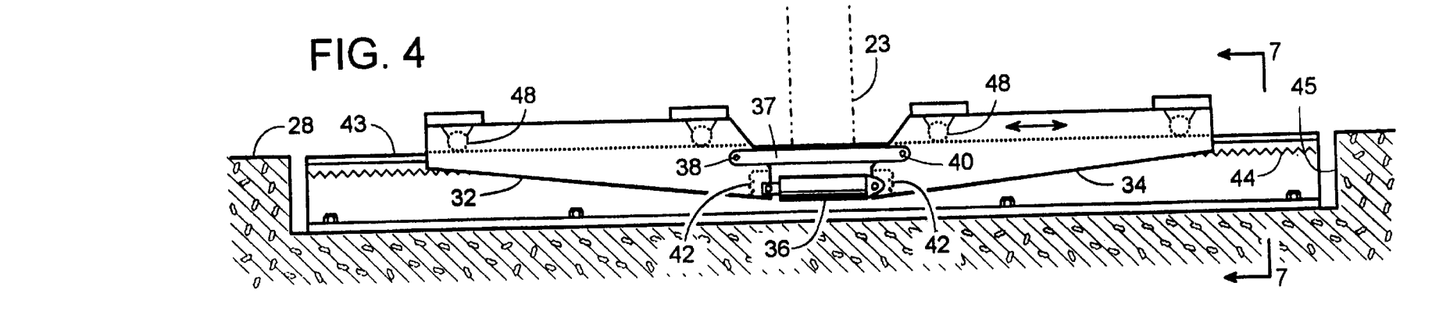
FIG. 4 is a side view of a brace in a retracted position.
Figure 5:
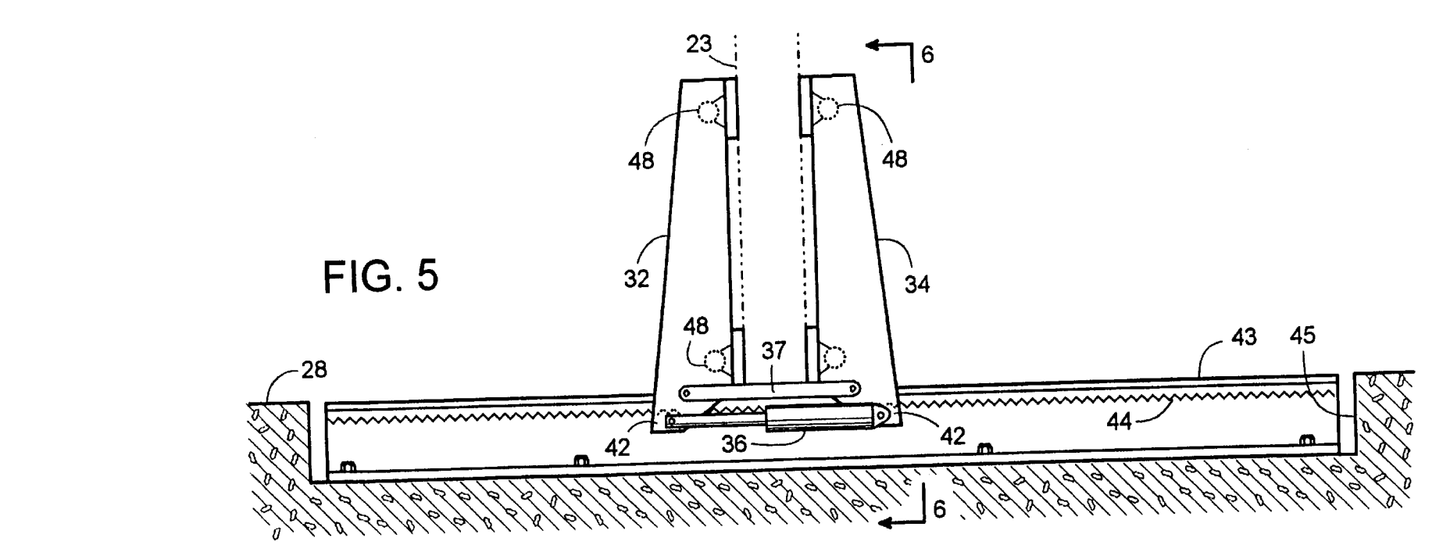
FIG. 5 is a side view of a brace in an engaged position.
Figure 6:
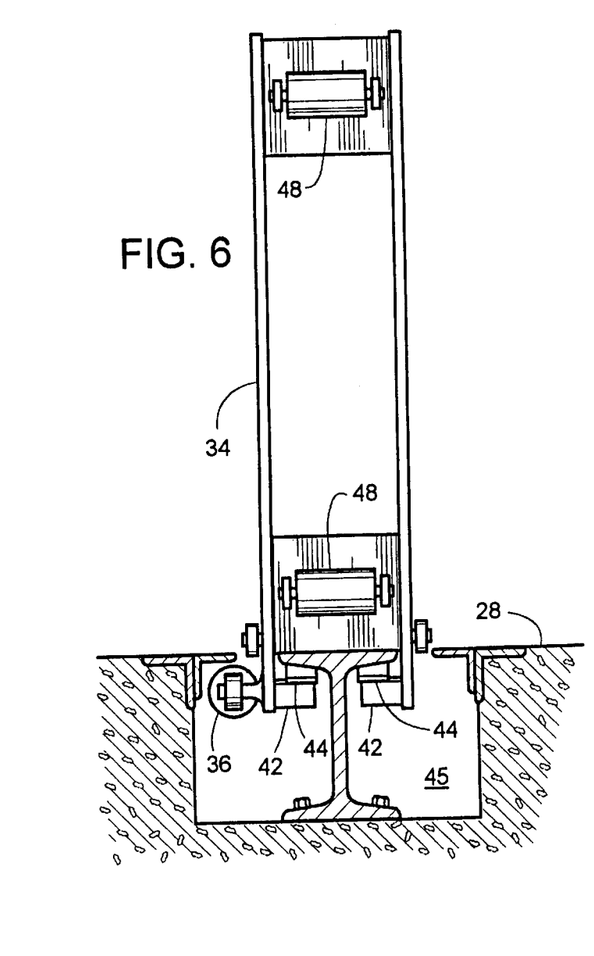
FIG. 6 is a view taken along line 6—6 of FIG. 5
Figure 7:
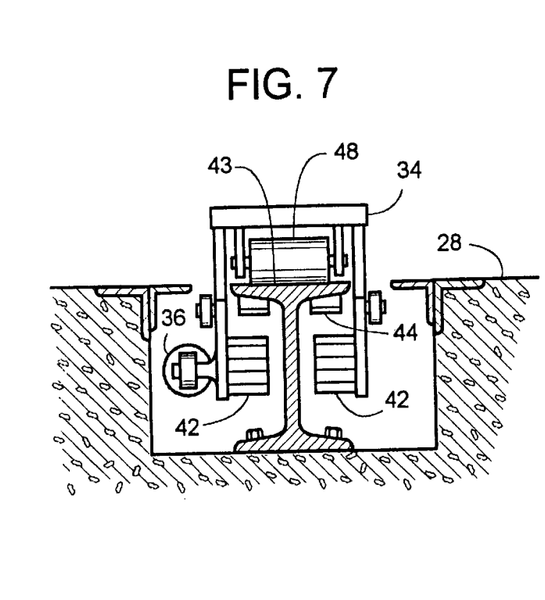
FIG. 7 is a view taken along line 7—7 of FIG. 4.
Figure 8:
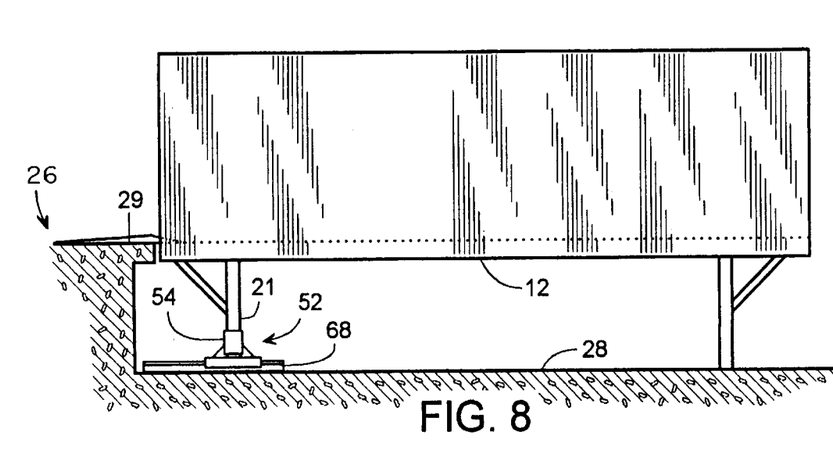
FIG. 8 is a side view of another embodiment.

For example, opposing braces 32 and 34 can each engage and help support opposite sides of one of legs 21–24, such as forward leg 23, as shown in FIGS. 2 and 3. Details of braces 32 and 34 are shown in FIGS. 4, 5, 6 and 7. In this embodiment, braces 32 and 34 are coupled by a link 37, pivotally connected to both braces at points 38 and 40 respectively, to form a clamping arrangement on leg 23. To move the clamping arrangement between retracted (FIG. 4) and engaged (FIG. 5) positions, a piston/cylinder 36 is coupled to braces 32 and 34. Extension of piston/cylinder 36 causes each brace 32 and 34 to pivot relative to link 37, and move to a generally upright engaged position, as shown in FIGS. 2, 3, 5, and 6. Conversely, cylinder 36 is retracted to selectively lower the braces to a retracted position where braces 32 and 34 are disposed parallel to the driveway, as shown in FIGS. 4 and 7. The retracted position of braces 32 and 34 is chosen so that the braces present little or no impediment to a vehicle approaching the dock.

As used herein, the term "engaged position" is not limited to positions where a brace or braces actually makes physical contact with a swap body leg. Rather, "engaged position" denotes a range of positions in which a brace (or a portion thereof) is either in contact with the leg, or in such close proximity thereto that small movement of the leg would cause it to contact the brace.

While the swap body restraint according to this design could be fixed in place on the driveway relative to the dock, containers 10 can be inconsistently placed on the driveway relative to the dock. Also, different containers have different leg positions. It may thus be advantageous to have the leg restraint be capable of movement relative to the driveway and to the dock to adjust to different leg positions. Of course, it is also desirable to lock the restraint in place once deployed.

Toward that end, a restraint incorporating clamping-type braces 32 and 34 may include a locking arrangement that allows the braces to move relative to the dock when retracted, but that locks them in place once moved to a raised, engaged position relative to the legs. In one example of such a locking arrangement, an elongated toothed member 44 is fixed relative to the driveway, such as by being fixed to the upper flange of an I-beam 43 disposed within a recess 45 in the driveway. Each brace 32 and 34 includes a member 42 that is disposed on brace 32 and 34 so as to engage member 44 when the brace is in its upright, engaged position relative to a leg 23 of the container. At the same time, members 42 are disposed to move out of engagement with member 44 as the braces 32 and 34 move toward the retracted position. This locking arrangement thus takes advantage of the approximately 90 degrees rotation of braces 32 and 34 between their engaged and retracted positions to move members from a locking engagement with member 44 to a spaced position relative thereto.

When braces 32 and 34 are in the retracted position, they are thus free to move relative to the loading dock. Illustratively, such movement may be facilitated by one or more rollers 48, which roll over the top surface of I-beam 43. In operation, then, the clamping-style restraint can be first properly positioned relative to leg 23, and then actuated into its engaged position relative thereto. As a further advantage of this design, support structure or I-beam 43 can also serve as a landing pad for receiving leg 23, making up for inconsistency or unevenness in the driveway surface.

It should be understood that a clamping-type restraint, as shown in FIGS. 2–7 could be implemented using structures besides these shown. For example, other extendible/retractable actuators could be used in place of the piston/cylinder 36. Moreover, such an actuator could be used and, if properly oriented relative to braces 32 and 34, could retract (shorten) to move the braces from the retracted to the stored position, instead of the opposite as in the disclosed embodiment. Other elements could also be used to form the locking arrangement or mechanism, as the toothed members represent only a presently preferred arrangement. Other support structures are also possible.

For example, a brace 52 of FIGS. 8–13 is a support structure whose location on driveway 28 is readily adjustable to align to the various positions at which container legs 21 may rest upon driveway 28. Containers of various lengths and a truck/trailer failing to set a container down at a precise location, may call for a brace having two degrees of positional adjustment: longitudinally (to and from the dock) as well as some lateral adjustment. Also, a support structure establishing a firm vertical datum for the container might help in vertically aligning the inside floor of the container to an upper platform 29 of the dock. In some installation sites, electrical service, hydraulics, pneumatics and other power may not be available or economical to provide, so a manually or mechanically operated support structure may be preferred.

To this end, brace 52 is a manually operated leg support structure whose position is adjustable both laterally and longitudinally along driveway 28. A carriage assembly 53 manually slid along a track 68 provides brace 52 with longitudinal adjustment (reference numeral 80 of FIG. 12). An anchor pin 70 pivotally couples track 68 to driveway 28 to render the position of brace 52 laterally adjustable (reference numeral 72 of FIG. 13) by way of rotating track 68 about pin 70. Track 68 also provides a firm landing pad upon which a container leg 21 can rest.

Figure 9:
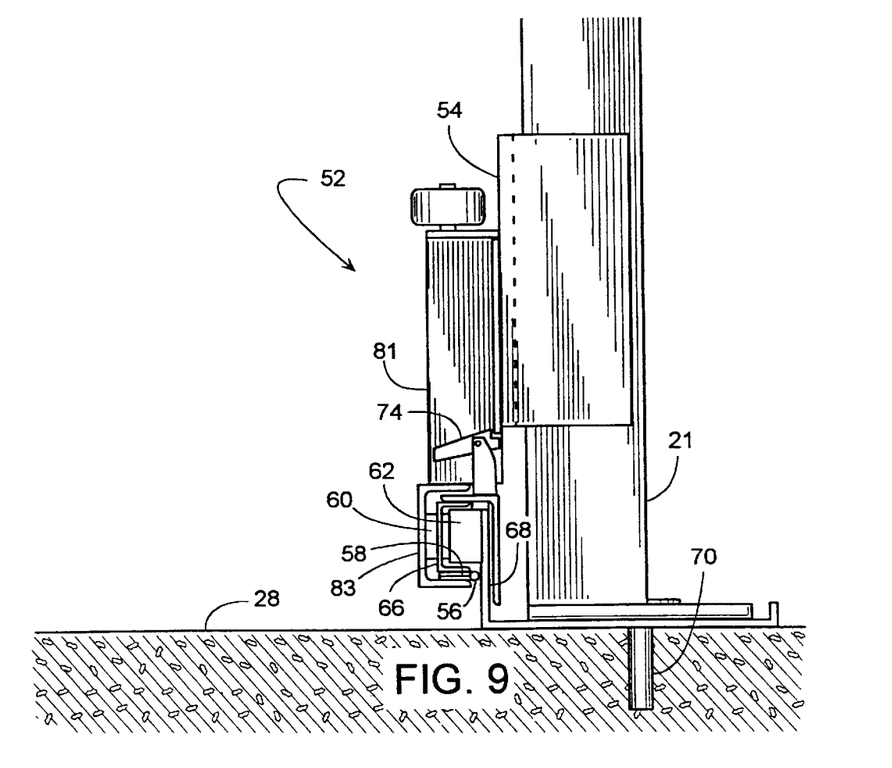
FIG. 9 is an end view of another brace in the engaged position.
Figure 10:
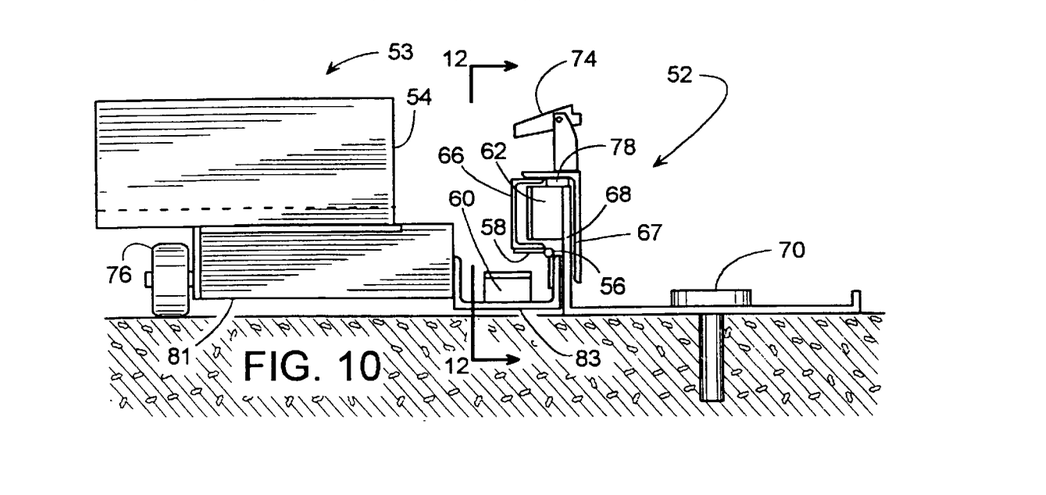
FIG. 10 is end view of the embodiment of FIG. 9, but in the retracted position.
Figures 11, 13:
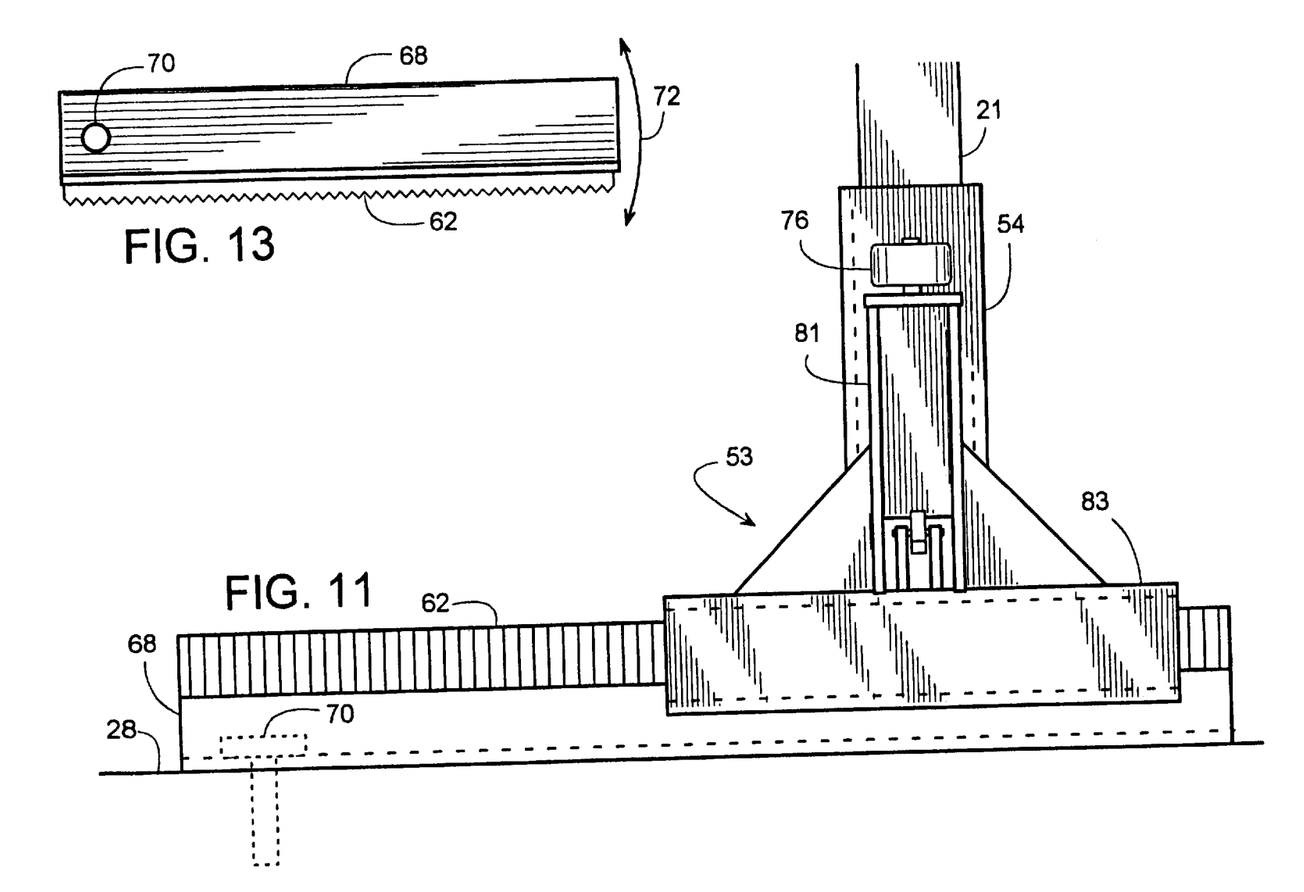
FIG. 11 is a side view of the embodiment shown in FIG. 9.
FIG. 13 is a top view of the track of FIGS. 9, 10, 11, and 12.
Figure 12:
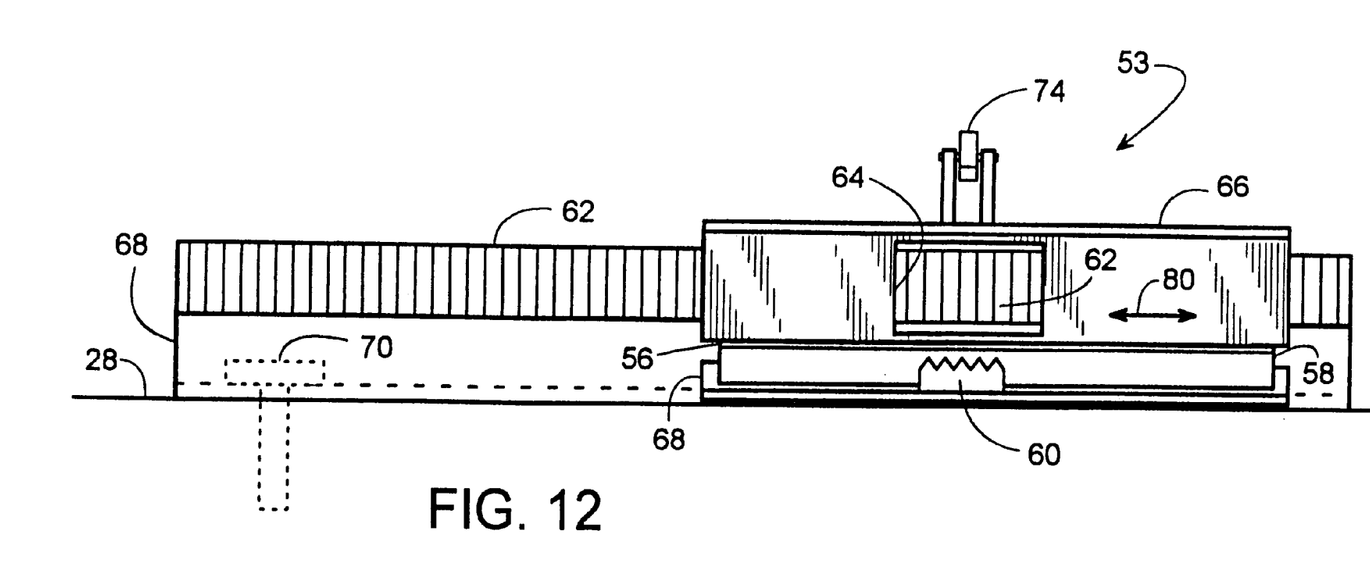
FIG. 12 is a view taken along line 12—12 of FIG. 10.

To restrain leg 21, carriage 53 includes a hinge 58 having a longitudinal axis 56 about which a U-shaped channel 54 swings from a released horizontal position (FIGS. 10 and 12) to a generally upright engaged position (FIGS. 9 and 11). In the engaged position, channel 54 at least partially surrounds one of the container's legs to help maintain the leg in its normally upright position and help prevent the leg from slipping horizontally. As channel 54 swings upward to its engaged position, it may also be advantageously locked in place. Toward that end, a locking member 60 coupled to channel 54, by way of a support 81 and a channel 83, protrudes through opening 64 (FIG. 12) to engage an elongated toothed member 62 (e.g., a gear rack) that is fixed relative to track 68. Locking member 60 engaging rack 62 prevents further longitudinal movement/adjustment of carriage 53 once leg 21 is engaged by brace 52. With leg 21 restrained, a latch 74 engages support 81 to prevent channel 54 from falling back down to its release position. Manually actuating latch 74 allows channel 54 to be manually lowered to its release position. Once released, carriage 53 can be moved along track 68 while assisted by a roller 76 extending from support 81 and assisted by a bearing pad 78 that slidingly couples channel 66 and an angle 67 to track 68.

In operation, a truck delivers a swap body container to the driveway of the parking or loading dock area, and the initial lowering of the container's legs serves to point out the general location at which track 68 and carriage 53 should be positioned. Once brace 52 is properly positioned, the truck lowers the container until it is self-supported by its legs resting upon track 68 and driveway 28. Support 81 is then raised to the generally upright engaged/locked position where it partially surrounds leg 21. This helps prevent leg 21 from sliding longitudinally away from the dock or leaning too far away from the dock. When the loading or unloading of the container is complete, actuating latch 74 releases support 81, so that support 81 may be lowered back down to allow a truck to remove the container from the area.

It should be noted that a brace that approaches a container leg from the side, as in the embodiment of FIGS. 8–13, could be implemented using structures besides these shown. Tilting the channel brace 54 can be powered by hydraulics, pneumatics or even by the weight of the container being lowered onto the track. Further, the actuator itself could incorporate the holding function of latch 74. Other elements could also be used to form the locking arrangement or mechanism, as the toothed members 60 and 62 represent only a presently preferred arrangement.

Figure 14:
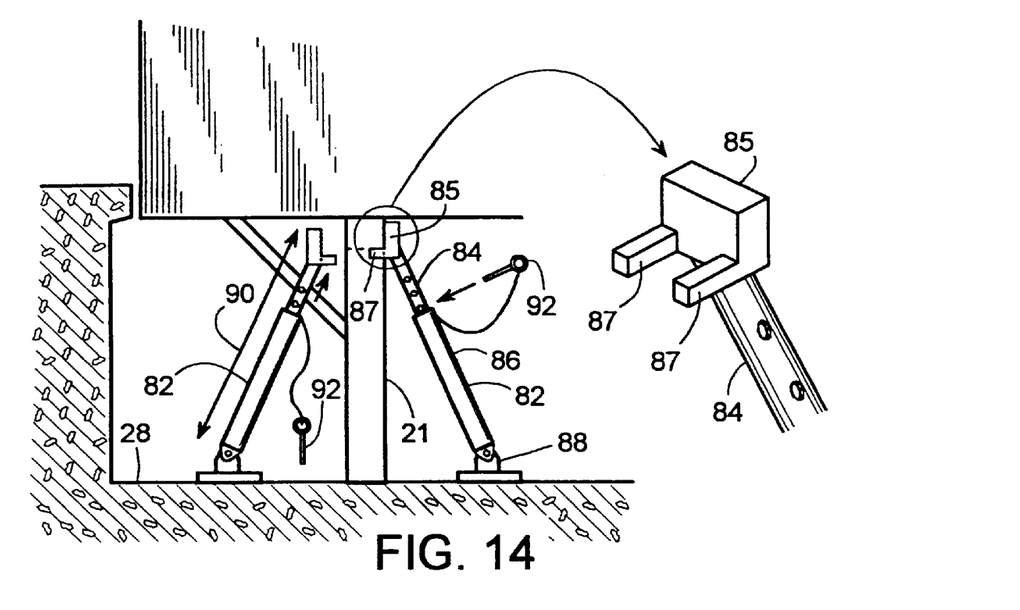
FIG. 14 is a side view of another embodiment with an encircled portion enlarged and shown in perspective.

Another example of a manually adjustable leg support is provided by a brace 82 that extends between an upper portion of leg 21 and driveway 28, as shown in FIG. 14. In this embodiment, brace 82 includes an upper member 84 and a lower member 86 with upper member 84 having a bracket 85 that is U-shaped to effectively engage the upper portion of leg 21. From its enlarged perspective view, bracket 85 is shown to include two protrusions 87 that help hold bracket in place by straddling leg 21. Lower member 82 is attached to a base 88. Base 88 can be coupled to driveway 28 by relying simply on friction alone between the two or by permanently or removably pinning base 88 to driveway 28 to provide a more solid connection. Providing brace 82 with an adjustable length 90 accommodates variations in leg position. In one embodiment, the adjustable length is accomplished by having one member 82 or 84 telescope within the other, while a removable pin 92 selectively locks and releases the two.

Figure 15:
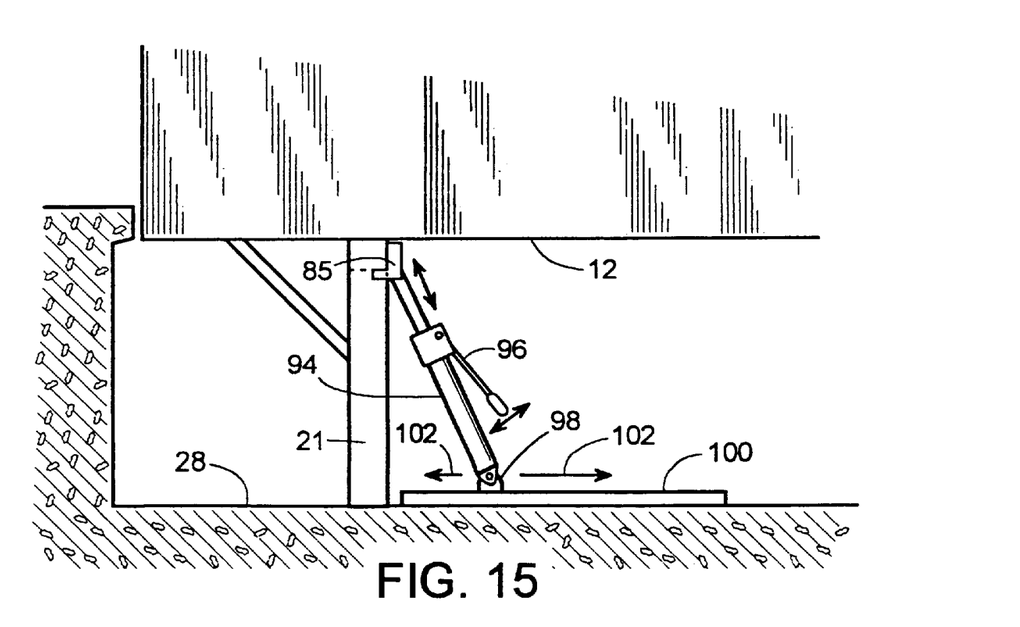
FIG. 15 is a side view of another embodiment.

In another embodiment, the adjustable length is provided by a brace 94 that incorporates a manually operated hydraulic jack 96, as shown in FIG. 15. As with the brace of FIG. 14, brace 96 includes an upper member 85 that is shaped to effectively engage leg 21, while a lower member of jack 96 is pivotally attached to a base 98. However, greater variations in leg position are accommodated in this embodiment by having the position of base 98 be adjustable in a longitudinal direction 102 along a track 100 that is anchored to driveway 28. Once properly positioned, base 98 is clamped or otherwise fixed to track 100 by any conventional holding or positioning mechanism including, but not limited to, a pin and socket, mechanical clamp, lead screw and nut, piston/cylinder, rodless cylinder or some other type of actuator. With container 12 parked, base 98 is moved along track 100 to a position where jack 96 can reach to place upper member 85 into engagement with the upper portion of leg 21. Base 98 is then fixed to track 100 and jack 96 is extended to have upper member 85 firmly engage leg 21, thereby restraining container 12.

Figure 16:
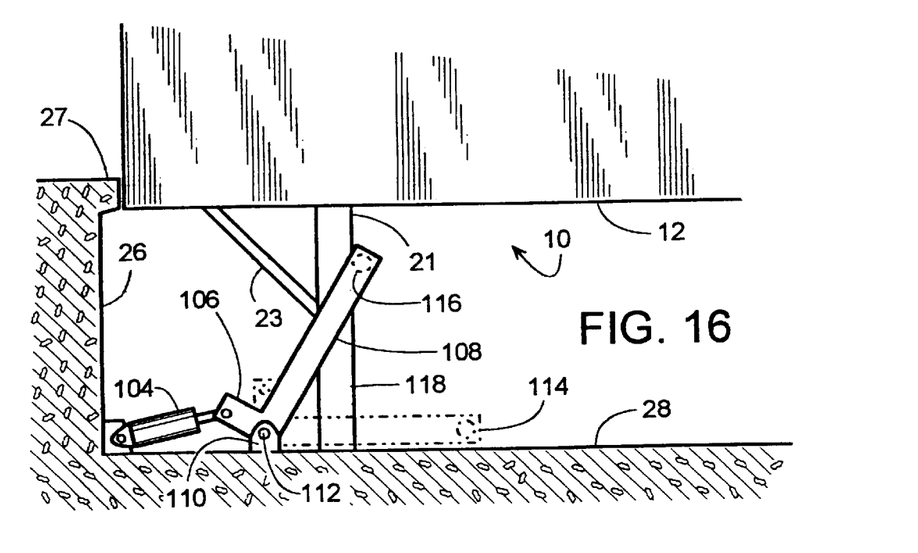
FIG. 16 is a side view of another embodiment.
Figure 17:
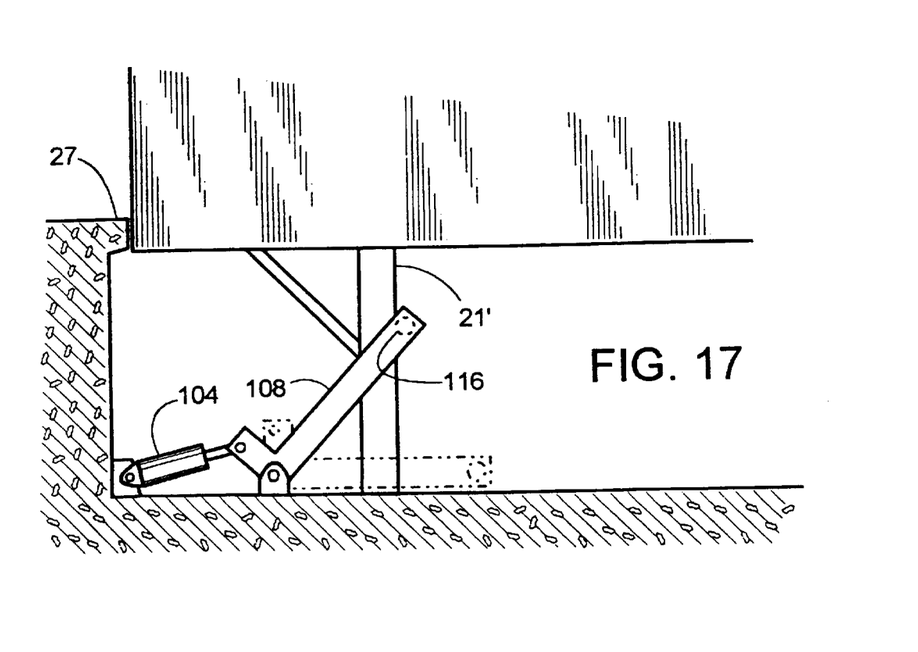
FIG. 17 is a side view of the embodiment of FIG. 16, but with the brace engaging the leg of another swap body.

Other embodiments of a pivoting leg restraint accommodate for various leg positions by varying the extent to which the restraining member pivots. In FIGS. 16 and 17, for example, a brace 108 with a laterally extending arm 116 is pivotally coupled to a base 110, which in turn is anchored to driveway 28. An actuator, e.g., piston/cylinder 104, acts between a stationary surface such as driveway 28 or dock 26 and brace 108. The actuator retracts to move brace 108, about a lateral axis 112, from a retracted position 114 (shown in phantom) to an engaged position. After moving to the engaged position, cylinder 104 is adapted to hold it there. In the engaged position, laterally extending arm 116 engages a forward side 118 of leg 21 at an elevation above where leg 21 connects to its corresponding leg brace 23. This allows brace 108 to urge leg 21 towards dock platform 27, while avoiding bending stresses in the leg that might otherwise exist if arm 116 were to engage leg 21 below leg brace 23. In this embodiment, the closer the leg is to dock platform 27, the more brace 108 pivots, and the higher arm 116 engages the leg. For example, leg 21 of FIG. 16 is closer to dock platform 27 than is leg 21' of FIG. 17. Accordingly, arm 116 engages leg 21 higher than it does leg 21'.

Cylinder 104 extending lowers brace 108 to release swap body 10. Although in this embodiment, the movement of brace 108 is carried out by a cylinder acting upon a lug 106 that extends from brace 108, various other actuators and connections that could couple the actuator to the leg restraint are well within the scope of the invention. For example, actuator 104 could be coupled directly to brace 108 rather than through lug 106, and actuator 104 could act upon the opposite side of brace 108 rather than as shown, which would cause the extension of cylinder 104 to lift the brace up instead of lower it. And the actuator itself does not necessarily have to be a piston/cylinder. Examples of other actuators that would also work would include, but not be limited to, a lead screw and nut, a motor driven linear actuator, and a winch.

Figure 18:
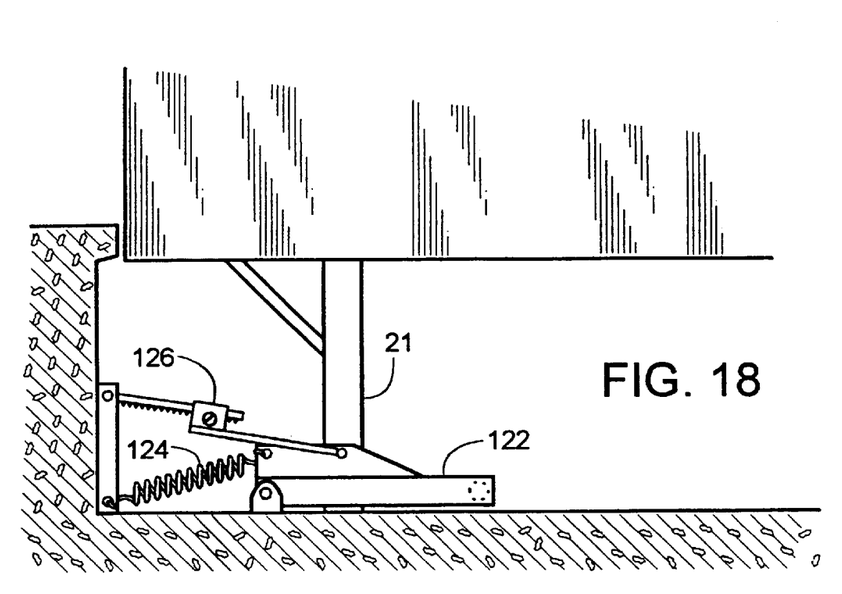
FIG. 18 is a side view of another embodiment.
Figure 19:
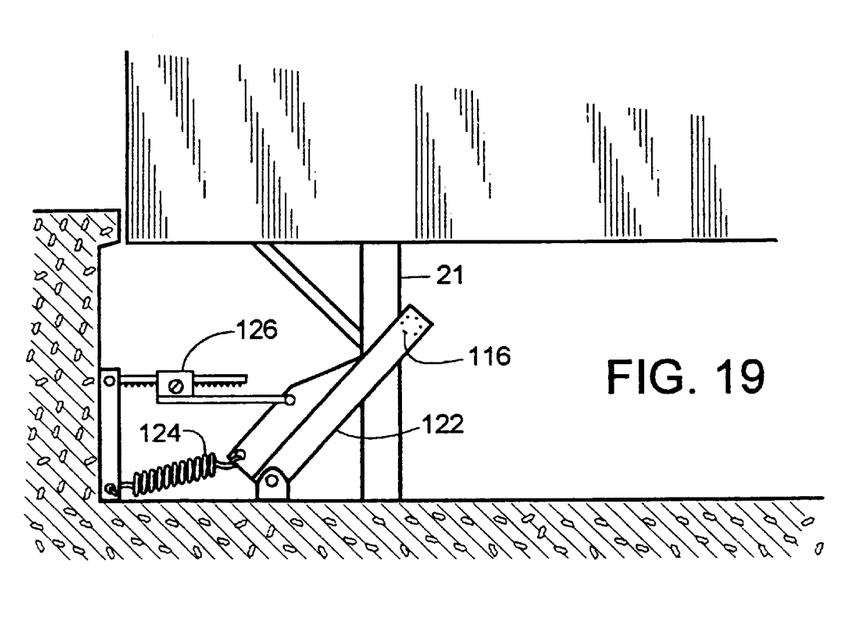
FIG. 19 is a side view of the embodiment of FIG. 18, but with the brace in an engaged position.

Another example of an actuator would include manual actuation with a counter balance, as shown in the embodiment of FIGS. 18 and 19. A brace 122 is similar to brace 108, but with cylinder 104 replaced by a tension spring 124 co-acting with a ratchet-type locking device 126. Spring 124 reduces the force needed to manually lift brace 122 from a retracted position of FIG. 18 to an engaged position of FIG. 19. Once in the engaged position, ratchet 126 helps hold brace 122 in place. Ratchet 122 is schematically illustrated to represent any one of a variety of locking devices including, but not limited to, a Rite-Hite Model Releasable Hold-Down Assembly, which is disclosed in U.S. Pat. No. 3,699,601 and specifically incorporated by reference herein.

Figure 20:
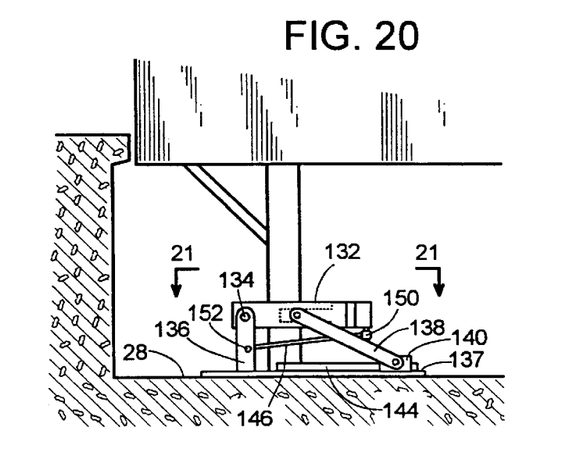
FIG. 20 is a side view of another embodiment.
Figure 22:
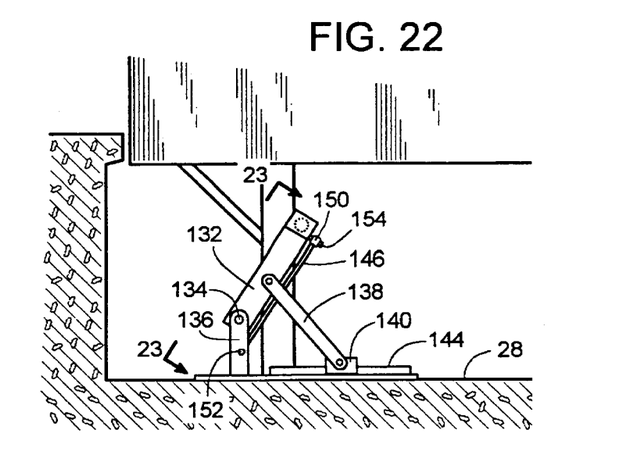
FIG. 22 is a side view of the embodiment of FIG. 20, but in an engaged position.
Figure 23:
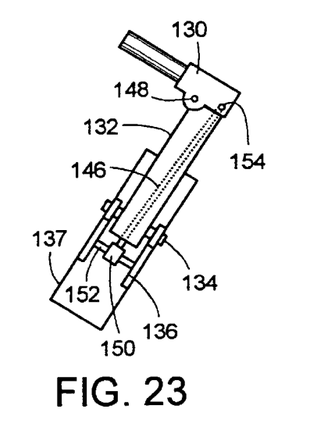
FIG. 23 is a view taken along line 23—23 of FIG. 22.

Another variation of the leg restraint of FIGS. 16 and 17 is to make laterally extending arm 116 retractable to allow the wheels of the truck more room on the driveway as the truck delivers or removes a swap body. This can be done in variety of ways, but in one exemplary embodiment (shown in FIGS. 20–23) a leg restraining arm 130 retracts and extends automatically in reaction to a brace 132 moving between its release position (FIGS. 20 and 21) and its engaged position (FIGS. 22 and 23). In this example, brace 132 pivots about an axis or pin 134 supported between two side members 136, which in turn extend upward from a base 137 that is anchored to driveway 28. An angular support 138 pivotally couples brace 132 to a carriage 140 (138 and 140 are not shown in FIG. 23 for clarity). Carriage 140 moves (e.g., slides or rolls) along a track 144 as brace 132 pivots about 134. With a brace powered up and/or down, carriage 140 and track 144 schematically represent an actuator such as a lead screw and nut, piston/cylinder, or some other conventional actuator or drive unit that moves brace 132 up and/or down. Conversely, with a manually operated brace (depicted in FIG. 24, and bearing the same reference numerals as FIGS. 20–23, but supplemented with a prime, as in 140'), carriage 140' simply follows the motion of brace 132' as brace 132' is lifted or lowered manually. With the manual brace, carriage 140' includes a manually releasable locking element that selectively locks onto and releases track 144' in a manner well known to those skilled in the art or similar to those already explained (e.g., releasably engaging an elongated tooth member, such as a gear rack). Regardless of the how brace 132 is moved, a connecting rod 146 forces leg restraining arm 130 to pivotally extend (FIG. 23) and pivotally retract (FIG. 21) about a pin 148 that couples arm 130 to brace 132. An angularly compliant coupling, such a rod bearing 150, is at each end of rod 146 to couple a pin 152 of side member 136 to another pin 154 that extends from arm 130. As brace 132 pivots upward about pin 134, pin 148 moves farther away from pin 152, while pin 154 does not due to the fixed length of rod 146. Consequently, arm 130 extends. The reverse happens as brace 132 pivots back down.

Figure 21:
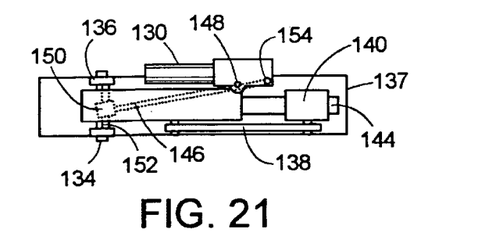
FIG. 21 is a top view taken along line 21—21 of FIG. 20.

It should be noted that the mechanism to extend and retract arm 130 in reaction to moving brace 132 represents just one many possible ways in which this can be carried out, or example, arm 130 could retract linearly or pivot in other directions, such as 180 degrees from the its position shown in FIG. 21.

Figure 24:
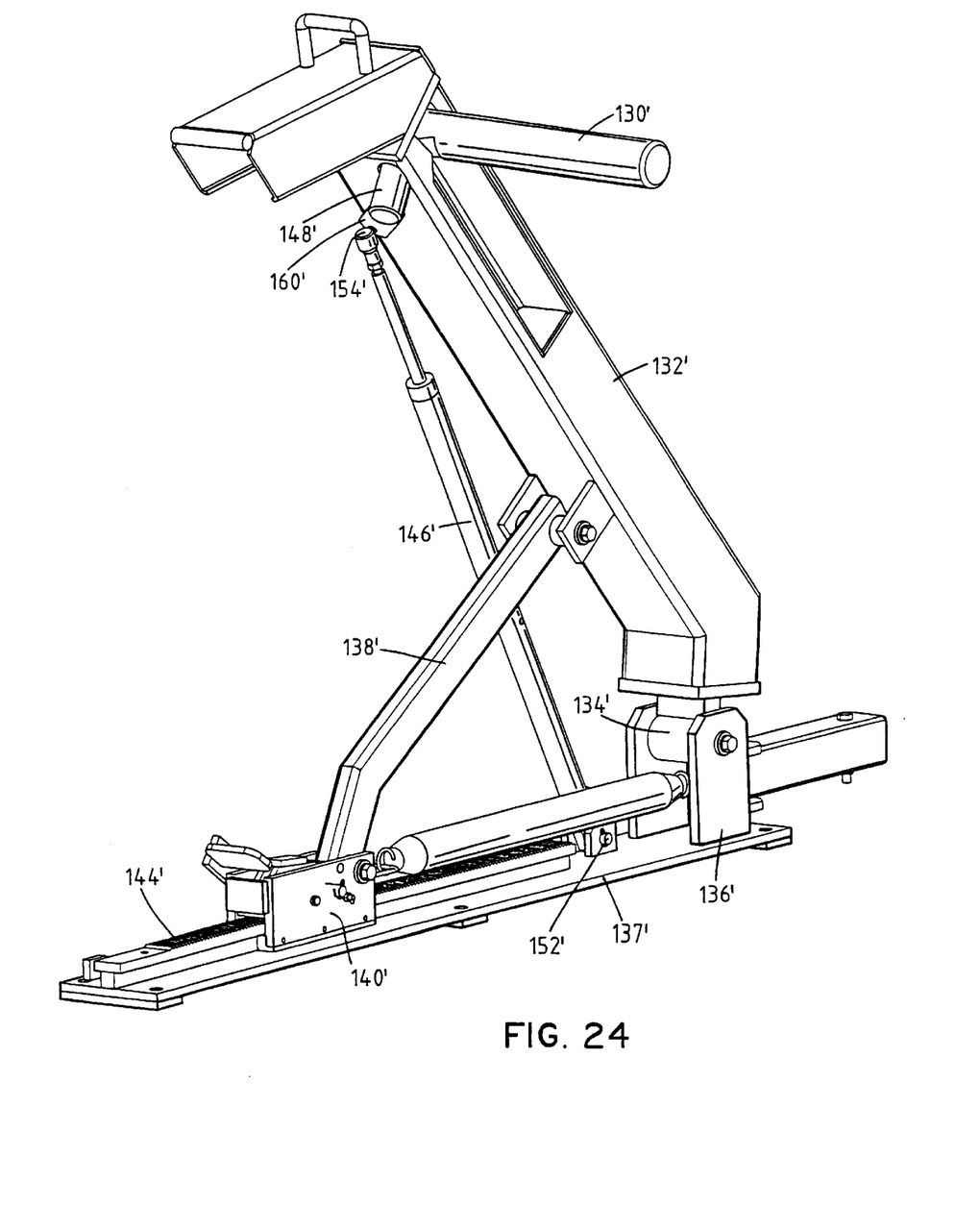
FIG. 24 is a perspective view of an embodiment similar to that of FIGS. 20–23.

Further, the extension of arm 130' is slightly different in the manual embodiment of FIG. 24. A tab 160' is fixed for rotation with pin 148'. As brace 132' is raised, pin 148' moves further from pin 152' than does the end of tab 160' coupled to rod 146' at angularly compliant coupling 154'. This exerts a torque on pin 148' causing arm 130' to rotate and extend. Note that rod 146' may be adjustable in length, yet includes a stop to limit its extension to ensure rod 130' is properly extended and retracted.

Further still, each restraint shown herein could be provided with a means for sensing when the restraint is in an engaged and/or locked position. Appropriate visual signals (red lights, green lights, etc.) or audio signals could be connected to this sensing means to give dock personnel, drivers and the like appropriate indications that the swap body either is or is not properly restrained from movement.

Although the invention is described with respect to a preferred embodiment, modifications thereto will be apparent to those skilled in the art. Therefore, the scope of the invention is to be determined by reference to the claims, which follow.

We claim:

1. A restraint for limiting the movement of a swap body in a parked position, the swap body having a length extending along a longitudinal direction and a width extending along a lateral direction, the swap body having a container with at least one leg that is repositionable from a downwardly extended position to a stowed position for traveling, when in the downwardly extended position, the leg being adapted to rest upon a driveway to support the container above the driveway in the parked position, the restraint comprising:
    a brace selectively positionable to a retracted position and an engaged position,
    an anchor point adapted to be spaced apart from the swap body and adapted to couple the brace to the driveway, and
    an engagement end disposed on the brace, the brace extending generally linearly from the anchor point to the engagement end, the engagement end adapted to engage the at least one leg when the brace is in the engaged position, the engagement end being adapted to be spaced apart from the at least one leg when the brace is in the retracted position.

2. The restraint as recited in claim 1, further comprising a track adapted to be fixed adjacent the driveway, wherein the position of the anchor point is adjustable along the track when the brace is at the retracted position and the position of the anchor point is substantially fixed to the track when the brace is at the engaged position.

3. The restraint as recited in claim 2, wherein the position of the anchor point changes from being adjustable to fixed in direct response to the brace moving from the retracted position to the engaged position.

4. The restraint as recited in claim 1, wherein the engagement end is movably disposed on the brace between an extended position and a return position.

5. The restraint as recited in claim 4, wherein the engagement end is pivotally movable.

6. The restraint as recited in claim 5, wherein the engagement end moves between its extended position and the return position in direct response to the brace moving from its retracted position to the engaged position.

7. The restraint as recited in claim 1, further comprising a metal landing pad adapted to be attached to the driveway and coupled to the brace, the metal landing pad being adapted to be interposed between the driveway and the bottom end of the at least one leg.

8. The restraint as recited in claim 1, wherein the anchor point is a pivot about which the brace pivots between the retracted position and the engaged position.

9. The restraint as recited in claim 8, wherein the brace is pivotal about a lateral axis that extends in the lateral direction, and the brace is substantially upright when the brace is in the engaged position.

10. The restraint as recited in claim 9, further comprising a track attachable to the driveway to extend in the longitudinal direction, the brace being movably coupled to the track, whereby alignment of the brace to the at least one leg is rendered adjustable in the longitudinal direction.

11. The restraint as recited in claim 9, further comprising a corresponding brace opposing the brace, the brace and the corresponding brace pivoting toward each other upon moving from the retracted position to the engaged position.

12. The restraint as recited in claim 9, further comprising a piston and a cylinder coupled to move the brace from the retracted position to the engaged position.

13. The restraint as recited in claim 8, wherein the brace is pivotal about a longitudinal axis, the longitudinal axis extending in the longitudinal direction, and the brace is substantially upright when the brace is in the engaged position.

14. The restraint as recited in claim 13, further comprising a track attachable to the driveway and being adapted to extend in the longitudinal direction, the brace being movably coupled to the track, whereby alignment of the brace to the at least one leg is rendered adjustable in the longitudinal direction.

15. The restraint as recited in claim 14, further comprising a first releasable lock that selectively allows and inhibits movement of the brace relative to the track along the longitudinal direction.

16. The restraint as recited in claim 15, further comprising a second releasable lock that selectively allows and inhibits pivotal motion of the brace about the longitudinal axis.

17. The restraint as recited in claim 8, wherein the brace is pivotal about a lateral axis that extends in the lateral direction; the brace has an adjustable length between the anchor point and the engagement end; and the brace is inclined appreciably greater than horizontal and appreciably less than vertical when in the engaged position.

18. The restraint as recited in claim 17, wherein the brace includes an upper member having the engagement end and a lower member having the anchor point, the upper member being in telescoping relationship with the lower member.

19. The restraint as recited in claim 18, further comprising a releasable locking mechanism selectively locking and releasing the upper member in relation to the lower member.

20. The restraint as recited in claim 17, further comprising a track attachable to the driveway to extend in the longitudinal direction, the brace being movably coupled to the track, whereby alignment of the brace to the at least one leg is rendered adjustable in the longitudinal direction.

21. The restraint as recited in claim 17, further comprising a hydraulic cylinder coupled to the brace and at least partially determining the adjustable length between the anchor point and the engagement end.

22. The restraint as recited in claim 8, wherein the pivot is adapted to remain at a substantially fixed location in relation to the driveway.

23. The restraint as recited in claim 22, wherein a height at which the engagement end is adapted to engage the at least one leg decreases with a distance at which the at least one leg becomes spaced apart from the pivot.

24. The restraint as recited in claim 22, further comprising a lever rigidly extending from the brace, the lever transmitting a force driving the brace to at least one of the retracted position and the engaged position.

25. The restraint as recited in claim 24, further comprising a releasable lock that selectively inhibits and releases movement of the brace away from the engaged position.

26. The restraint as recited in claim 25, wherein the releasable lock includes a ratchet.

27. A restraint for limiting the movement of a swap body in a parked position, the swap body having a length extending along a longitudinal direction and a width extending along a lateral direction, the swap body having a container with at least one leg that is repositionable from a downwardly extended position to a stowed position for traveling, when in the downwardly extended position, the leg being adapted to rest upon a driveway to support the container above the driveway in the parked position, the restraint comprising:

a brace selectively repositionable to a retracted position and an engaged position, with the brace being substantially upright in the engaged position, a pivot defining a lateral axis that extends in the lateral direction, the pivot being adapted to be spaced apart from the swap body and adapted to pivotally couple the brace to the driveway, and an engagement end disposed on the brace, the brace extending generally linearly from the point to the engagement end, the engagement end adapted to engage the at least one leg when the brace is in the engaged position, the engagement end being adapted to be spaced apart from the at least one leg when the brace is in the retracted position.

28. The restraint as recited in claim 27, further comprising a track attachable to the driveway to extend in the longitudinal direction, the brace being movably coupled to the track, whereby alignment of the brace to the at least one leg is rendered adjustable in the longitudinal direction.

29. The restraint as recited in claim 28, further comprising a corresponding brace opposing the brace, the brace and the corresponding brace pivoting toward each other upon moving from the retracted position to the engaged position.

30. A restraint for limiting the movement of a swap body in a parked position, the swap body having a length extending along a longitudinal direction and a width extending along a lateral direction, the swap body having a container with at least one leg that is repositionable from a downwardly extended position to a stowed position for traveling, when in the downwardly extended position, the leg being adapted to rest upon a driveway to support the container above the driveway in the parked position, the restraint comprising:

a brace selectively pivotal from a retracted position to an engaged position, a pivot defining a lateral axis that extends in the lateral direction, the pivot adapted to be spaced apart from the swap body and adapted to pivotally couple the brace to the driveway; and an engagement end disposed on the brace, the engagement end adapted to engage the at least one leg when the brace is in the engaged position, the engagement end being adapted to be spaced apart from the leg when the brace is in the retracted position, the pivot being adapted to remain at a substantially fixed location in relation to the driveway regardless of a varying location of the leg, the at least one leg being adapted to be interposed between the engagement end and the pivot when the brace is at the engaged position.

31. The restraint as recited in claim 30, further comprising a spring coupled to the brace, the spring at least partially counteracting a moment created by a weight of the brace.

32. The restraint as recited in claim 30, further comprising a releasable lock that selectively inhibits and releases movement of the brace away from the engaged position.

33. The restraint as recited in claim 32, wherein the releasable lock includes a ratchet.

34. The restraint as recited in claim 30, wherein a height at which the engagement end is adapted to engage the at least one leg decreases with a distance at which the at least one leg becomes spaced apart from the pivot.

\* \* \* \* \*